United States Patent
Yamahara (10) Patent No.: US 10,310,698 B2
(45) Date of Patent: Jun. 4, 2019

(54) INFORMATION PROCESSING SYSTEM, INFORMATION PROCESSING METHOD, INFORMATION PROCESSING DEVICE, INFORMATION PROCESSING TERMINAL, FOR DYNAMICALLY CHANGING INFORMATION THAT FORMS THE BASIS OF A DISPLAYED SCREEN

(75) Inventor: Hisanori Yamahara, Tokyo (JP)

(73) Assignee: RAKUTEN, INC., Tokyo (JP)

( * ) Notice: Subject to any disclaimer, the term of this patent is extended or adjusted under 35 U.S.C. 154(b) by 99 days.

(21) Appl. No.: 14/119,887

(22) PCT Filed: Jan. 30, 2012

(86) PCT No.: PCT/JP2012/052014
§ 371 (c)(1),
(2), (4) Date: Nov. 25, 2013

(87) PCT Pub. No.: WO2012/164971
PCT Pub. Date: Dec. 6, 2012

(65) Prior Publication Data
US 2014/0129955 A1      May 8, 2014

(30) Foreign Application Priority Data
May 31, 2011 (JP) ................. 2011-122969

(51) Int. Cl.
*G06F 21/32* (2013.01)
*G06F 21/31* (2013.01)
(Continued)

(52) U.S. Cl.
CPC ........ *G06F 3/0481* (2013.01); *G06F 21/6245* (2013.01); *G06F 21/316* (2013.01);
(Continued)

(58) Field of Classification Search
CPC .... G06F 21/6245; G06F 21/316; G06F 21/84; G06F 21/32; G06F 2221/2149;
(Continued)

(56) References Cited

U.S. PATENT DOCUMENTS 7,181,438 B1 *   2/2007   Szabo ............... G06F 17/30522
7,305,381 B1 *  12/2007   Poppink ............ G06Q 10/107
(Continued)

FOREIGN PATENT DOCUMENTS

JP    2003-203139 A    7/2003
JP    2010-044642 A    2/2010
WO   2010/058683 A1    5/2010

OTHER PUBLICATIONS

International Search Report for PCT/JP2012/052014 dated Feb. 21, 2012.
(Continued)

*Primary Examiner* — Nicholas Klicos
(74) *Attorney, Agent, or Firm* — HEA Law PLLC (57) ABSTRACT

To enable dynamic changing of a range of information that forms a basis of a screen provided to a user depending on a change in an environment of an information processing terminal, an environmental information acquisition unit sequentially acquires environmental information representing an environment of a user terminal. A monitoring unit changes a publicly-displayable range of information on a user of the user terminal depending on a change in the environmental information sequentially acquired by the environmental information acquisition unit. A page changing unit limits the range of the information that forms the basis of the screen provided to the user so that the range of the information falls within the publicly-displayable range after the change.

7 Claims, 6 Drawing Sheets

(51) Int. Cl.
*G06F 3/0481* (2013.01)
*G06F 21/62* (2013.01)
*G06F 21/84* (2013.01)

(52) U.S. Cl.
CPC .............. *G06F 21/32* (2013.01); *G06F 21/84* (2013.01); *G06F 2221/032* (2013.01); *G06F 2221/2101* (2013.01); *G06F 2221/2105* (2013.01); *G06F 2221/2123* (2013.01); *G06F 2221/2139* (2013.01); *G06F 2221/2141* (2013.01); *G06F 2221/2149* (2013.01)

(58) Field of Classification Search
CPC ..... G06F 2221/2101; G06F 2221/2141; G06F 2221/2139
USPC .......................................................... 715/745
See application file for complete search history.

(56) References Cited

U.S. PATENT DOCUMENTS

| | | | | |
|---|---|---|---|---|
| 7,636,853 | B2 * | 12/2009 | Cluts | G06F 21/31 713/186 |
| 8,117,560 | B1 * | 2/2012 | Lu | G06F 3/0481 715/781 |
| 8,667,273 | B1 * | 3/2014 | Billstrom | G06F 21/6209 713/165 |
| 8,996,860 | B1 * | 3/2015 | Roth | H04L 67/14 713/153 |
| 2003/0088832 | A1 * | 5/2003 | Agostinelli | G06Q 30/02 715/273 |
| 2004/0057581 | A1 * | 3/2004 | Rhoads | H04N 1/32144 380/59 |
| 2004/0083394 | A1 * | 4/2004 | Brebner | G06F 21/31 726/19 |
| 2004/0218036 | A1 * | 11/2004 | Boss | G06F 21/62 348/14.08 |
| 2005/0060554 | A1 * | 3/2005 | O'Donoghue | G06F 21/36 713/183 |
| 2005/0138110 | A1 * | 6/2005 | Redlich | C07K 14/70575 709/201 |
| 2006/0129948 | A1 * | 6/2006 | Hamzy | G06F 21/84 715/790 |
| 2007/0011461 | A1 * | 1/2007 | Jeng | H04M 1/673 713/183 |
| 2007/0067852 | A1 * | 3/2007 | James | G06F 21/35 726/28 |
| 2007/0126884 | A1 * | 6/2007 | Xu | G06K 9/00221 348/220.1 |
| 2007/0234209 | A1 * | 10/2007 | Williams | G06F 17/241 715/700 |
| 2007/0294616 | A1 * | 12/2007 | Kizaki | H04N 1/00453 382/298 |
| 2008/0040290 | A1 * | 2/2008 | Harris | G06Q 20/40 705/36 R |
| 2008/0313537 | A1 * | 12/2008 | Tanaka | G06F 21/6227 715/274 |
| 2009/0106561 | A1 * | 4/2009 | Ejiri | G06F 21/62 713/193 |
| 2009/0182793 | A1 * | 7/2009 | Love | G06F 17/30286 |
| 2010/0048167 | A1 * | 2/2010 | Chow | H04L 29/12594 455/410 |
| 2010/0107219 | A1 * | 4/2010 | Thompson | G06F 21/6218 726/2 |
| 2010/0124363 | A1 * | 5/2010 | Ek | G06F 21/32 382/118 |
| 2010/0162285 | A1 * | 6/2010 | Cohen | H04H 60/31 725/12 |
| 2010/0317420 | A1 * | 12/2010 | Hoffberg | G06Q 30/0207 463/1 |
| 2011/0179366 | A1 * | 7/2011 | Chae | G06F 21/84 715/764 |
| 2012/0079586 | A1 * | 3/2012 | Brown | G06F 21/31 726/16 |
| 2012/0179325 | A1 * | 7/2012 | Faenger | B60K 35/00 701/31.4 |
| 2012/0253972 | A1 * | 10/2012 | Oskolkov | G06Q 30/02 705/26.8 |
| 2012/0306768 | A1 * | 12/2012 | Bailey | G09G 5/00 345/173 |
| 2013/0035854 | A1 * | 2/2013 | Zhang | G01C 21/367 701/455 |
| 2013/0088605 | A1 * | 4/2013 | Quarfordt | H04L 67/1044 348/207.1 |
| 2013/0244574 | A1 * | 9/2013 | Okuno | H04M 1/67 455/26.1 |
| 2015/0160788 | A1 * | 6/2015 | Sun | G06F 3/04817 715/746 |

OTHER PUBLICATIONS

English Translation of Written Opinion of the International Searching Authority for PCT/JP2012/052014 accompanied with PCT/IB/373 and PCT/IB/338 dated Dec. 12, 2013.

* cited by examiner

| USER ID | ITEM ID | PURCHASE DATE/ TIME INFORMATION |
|---|---|---|
| a001 | 0001 | 05/01/2011 11:05:30 |
| a001 | 0002 | 05/01/2011 11:05:30 |

| USER ID | PASSWORD | NAME DATA | SEX DATA | AGE DATA | ADDRESS DATA |
|---|---|---|---|---|---|
| a001 | a1b2c3 | .... | MALE | 50 | .... |
| b012 | x4y5z6 | .... | FEMALE | 35 | .... |
| | | | | | |

| ITEM ID | ITEM NAME DATA | ITEM TYPE DATA | PRICE DATA |
|---|---|---|---|
| 0001 | CADDIE BAG | GOLF GOODS | 12,000 YEN |
| 0002 | GOLF BALL | GOLF GOODS | 700 YEN |
| 0003 | PUTTER | GOLF GOODS | 10,000 YEN |
| | | | |

FIG.9

| SECRECY LEVEL SETTING ID | SETTING ATTRIBUTE DATA | SECRECY LEVEL DATA |
|---|---|---|
| 001 | ACCOUNT DATA/USER ID | 1 |
| 002 | ACCOUNT DATA/NAME | 2 |
| 003 | ACCOUNT DATA/SEX | 2 |
| 004 | ACCOUNT DATA/AGE | 2 |
| 005 | ACCOUNT DATA/ADDRESS | 3 |
| 006 | ACCESS HISTORY DATA/ALL | 4 |
| 007 | PURCHASE HISTORY DATA/ALL | 5 |

INFORMATION PROCESSING SYSTEM, INFORMATION PROCESSING METHOD, INFORMATION PROCESSING DEVICE, INFORMATION PROCESSING TERMINAL, FOR DYNAMICALLY CHANGING INFORMATION THAT FORMS THE BASIS OF A DISPLAYED SCREEN

CROSS REFERENCE TO RELATED APPLICATIONS

This application is a National Stage of International Application No. PCT/JP2012/052014 filed Jan. 30, 2012, claiming priority based on Japanese Patent Application No.2011-122969 filed on May 31, 2011. The contents of each of the above documents are incorporated herein by reference in their entirety.

TECHNICAL FIELD

The present invention relates to an information processing system, an information processing method, an information processing device, an information processing terminal, a program, and a storage medium.

BACKGROUND ART

There are shopping sites, and others which are configured to provide screens that have been customized for each user depending on a purchase history, a browsing history, sex, age, and the like.

As a privacy protection technology for such web sites, Patent Literature 1 discloses an information processing device that evaluates whether information is utilized or its use is limited from the viewpoint of a secrecy property and the like of the information, and is capable of limiting the use of the information when it is judged that its use must be limited.

CITATION LIST

Patent Literature

Patent Literature 1: JP 2003-203139 A

SUMMARY OF INVENTION

Technical Problem

In the conventional technology, after a customized screen is provided to a user, it has been impossible to dynamically change information that forms the basis of the screen. Therefore, it has not been possible for the user to promptly address a situation where, even if a change occurs in an environment of an information processing terminal used by the user, it is desired to change a range of the information that forms the basis of the customized screen.

The present invention has been made in view of the above-mentioned problem, and therefore has an object to enable dynamic changing of the range of the information that forms the basis of the screen provided to the user depending on the change in the environment of the information processing terminal.

Solution to Problem

In order to solve the above-mentioned problem, according to one embodiment of the present invention, there is provided an information processing system including: environmental information acquisition means for sequentially acquiring environmental information representing an environment of an information processing terminal; publicly-displayable range changing means for changing a publicly-displayable range of information on a user depending on a change in the environmental information sequentially acquired by the environmental information acquisition means; and limiting means for limiting a range of information that forms a basis of a screen provided to the user so that the range of the information falls within the publicly-displayable range after the change.

Further, according to one embodiment of the present invention, there is provided an information processing method including: an environmental information acquisition step of sequentially acquiring environmental information representing an environment of an information processing terminal; a publicly-displayable range changing step of changing a publicly-displayable range of information on a user depending on a change in the environmental information sequentially acquired in the environmental information acquisition step; and a limiting step of limiting a range of information that forms a basis of a screen provided to the user so that the range of the information falls within the publicly-displayable range after the change.

Further, according to one embodiment of the present invention, there is provided an information processing device including: environmental information acquisition means for sequentially acquiring, from an information processing terminal, environmental information representing an environment of the information processing terminal; publicly-displayable range changing means for changing a publicly-displayable range of information on a user depending on a change in the environmental information sequentially acquired by the environmental information acquisition means; and instruction output means for outputting, to the information processing terminal, an instruction to limit a range of information that forms a basis of a screen provided to the user so that the range of the information falls within the publicly-displayable range after the change.

Further, according to one embodiment of the present invention, there is provided an information processing terminal including: environmental information transmission means for transmitting, to an information processing device, environmental information representing an environment of the information processing terminal, the information processing device including: environmental information acquisition means for sequentially acquiring, from the information processing terminal, the environmental information representing the environment of the information processing terminal; publicly-displayable range changing means for changing a publicly-displayable range of information on a user depending on a change in the environmental information sequentially acquired by the environmental information acquisition means; and instruction output means for outputting, to the information processing terminal, an instruction to change a range of information that forms a basis of a screen provided to the user so that the range of the information falls within the publicly-displayable range after the change; and limiting means for limiting the range of the information that forms the basis of the screen provided to the user depending on the instruction output from the instruction output means.

Further, according to one embodiment of the present invention, there is provided an information processing terminal including: environmental information acquisition means for sequentially acquiring environmental information representing an environment of the information processing terminal; publicly-displayable range changing means for changing a publicly-displayable range of information on the user depending on a change in the environmental information sequentially acquired by the environmental information acquisition means; and limiting means for limiting information displayed on a screen received from an information processing device and provided to the user so that a range of information that forms a basis of the screen falls within the publicly-displayable range.

Further, according to one embodiment of the present invention, there is provided a program for causing a computer to function as: environmental information acquisition means for sequentially acquiring, from an information processing terminal, environmental information representing an environment of the information processing terminal; publicly-displayable range changing means for changing a publicly-displayable range of information on a user depending on a change in the environmental information sequentially acquired by the environmental information acquisition means; and instruction output means for outputting, to the information processing terminal, an instruction to limit a range of information that forms a basis of a screen provided to the user so that the range of the information falls within the publicly-displayable range after the change.

Further, according to one embodiment of the present invention, there is provided another program for causing a computer to function as: environmental information transmission means for transmitting, to an information processing device, environmental information representing an environment of the computer, the information processing device including: environmental information acquisition means for sequentially acquiring, from an information processing terminal, the environmental information representing the environment of the information processing terminal; publicly-displayable range changing means for changing a publicly-displayable range of information on a user depending on a change in the environmental information sequentially acquired by the environmental information acquisition means; and instruction output means for outputting, to the information processing terminal, an instruction to change a range of information that forms a basis of a screen provided to the user so that the range of the information falls within the publicly-displayable range after the change; and limiting means for limiting the range of the information that forms the basis of the screen provided to the user depending on the instruction output from the instruction output means.

Further, according to one embodiment of the present invention, there is provided still another program for causing a computer to function as: environmental information acquisition means for sequentially acquiring environmental information representing an environment of an information processing terminal; publicly-displayable range changing means for changing a publicly-displayable range of information on the user depending on a change in the environmental information sequentially acquired by the environmental information acquisition means; and limiting means for limiting, to the publicly-displayable range, a range of information that forms a basis of a screen received from an information processing device and provided to the user.

Further, according to one embodiment of the present invention, there is provided a storage medium having a program stored thereon, the program causing a computer to function as: environmental information acquisition means for sequentially acquiring, from an information processing terminal, environmental information representing an environment of the information processing terminal; publicly-displayable range changing means for changing a publicly-displayable range of information on a user depending on a change in the environmental information sequentially acquired by the environmental information acquisition means; and instruction output means for outputting, to the information processing terminal, an instruction to limit a range of information that forms a basis of a screen provided to the user so that the range of the information falls within the publicly-displayable range after the change.

Further, according to one embodiment of the present invention, there is provided another storage medium having a program stored thereon, the program causing a computer to function as: environmental information transmission means for transmitting, to an information processing device, environmental information representing an environment of the computer, the information processing device including: environmental information acquisition means for sequentially acquiring, from an information processing terminal, the environmental information representing the environment of the information processing terminal; publicly-displayable range changing means for changing a publicly-displayable range of information on a user depending on a change in the environmental information sequentially acquired by the environmental information acquisition means; and instruction output means for outputting, to the information processing terminal, an instruction to limit a range of information that forms a basis of a screen provided to the user so that the range of the information falls within the publicly-displayable range after the change; and limiting means for limiting the range of the information that forms the basis of the screen provided to the user depending on the instruction output from the instruction output means.

Further, according to one embodiment of the present invention, there is provided still another storage medium having a program stored thereon, the program causing a computer to function as: environmental information acquisition means for sequentially acquiring environmental information representing an environment of an information processing terminal; publicly-displayable range changing means for changing a publicly-displayable range of information on the user depending on a change in the environmental information sequentially acquired by the environmental information acquisition means; and limiting means for limiting, to the publicly-displayable range, a range of information that forms a basis of a screen received from an information processing device and provided to the user.

According to the present invention, the publicly-displayable range of the information on the user is changed depending on the change in the environmental information. Then, the range of the information that forms the basis of the screen provided to the user is limited to fall within the publicly-displayable range after the change. In this manner, according to the present invention, depending on the change in the environment of the information processing terminal, the range of the information that forms the basis of the screen provided to the user may be changed dynamically.

According to one aspect of the present invention, the publicly-displayable range changing means changes an information element determined from among one or more information elements on the user depending on the change in the environmental information sequentially acquired by the environmental information acquisition means, and in which the limiting means limits, to the determined information element, the range of the information that forms the basis of the screen provided to the user.

Further, according to one aspect of the present invention, to each of the one or more information elements, a secrecy level representing a degree of secrecy of the information is set, the information processing system further includes secrecy level threshold changing means for changing a threshold of the secrecy level depending on the change in the environmental information sequentially acquired by the environmental information acquisition means, and the publicly-displayable range changing means changes the determined information element based on the secrecy level set to the information element and the threshold of the secrecy level.

Further, according to one aspect of the present invention, an amount of change of the threshold of the secrecy level when the threshold of the secrecy level is changed so as to increase the secrecy is larger than an amount of change of the threshold of the secrecy level when the threshold of the secrecy level is changed so as to decrease the secrecy.

Further, according to one aspect of the present invention, a period from the change in the environmental information sequentially acquired by the environmental information acquisition means until the threshold of the secrecy level is changed so as to decrease the secrecy in response to the change is longer than a period from the change in the environmental information until the threshold of the secrecy level is changed so as to increase the secrecy in response to the change.

Further, according to one aspect of the present invention, environmental information as a criterion for changing the threshold of the secrecy level so as to increase the secrecy and environmental information for changing the threshold of the secrecy level so as to decrease the secrecy are different.

Further, according to one aspect of the present invention, the limiting means limits a range of information displayed on the screen provided to the user.

Further, according to one aspect of the present invention, the information processing system further includes control means for controlling information included in the screen provided to the user so that alternative information is arranged instead of information limited to be excluded from the screen.

Further, according to one aspect of the present invention, the environmental information acquisition means sequentially acquires information indicating a position of the information processing terminal, and the publicly-displayable range changing means changes the publicly-displayable range of the information on the user depending on a change in the position sequentially acquired by the environmental information acquisition means.

Further, according to one aspect of the present invention, the environmental information acquisition means sequentially acquires information indicating a travel amount of the information processing terminal, and the publicly-displayable range changing means changes the publicly-displayable range of the information on the user depending on a change in the travel amount sequentially acquired by the environmental information acquisition means.

DESCRIPTION OF EMBODIMENTS

Hereinafter, an embodiment of the present invention is described in detail with reference to the drawings.

Figure 1:
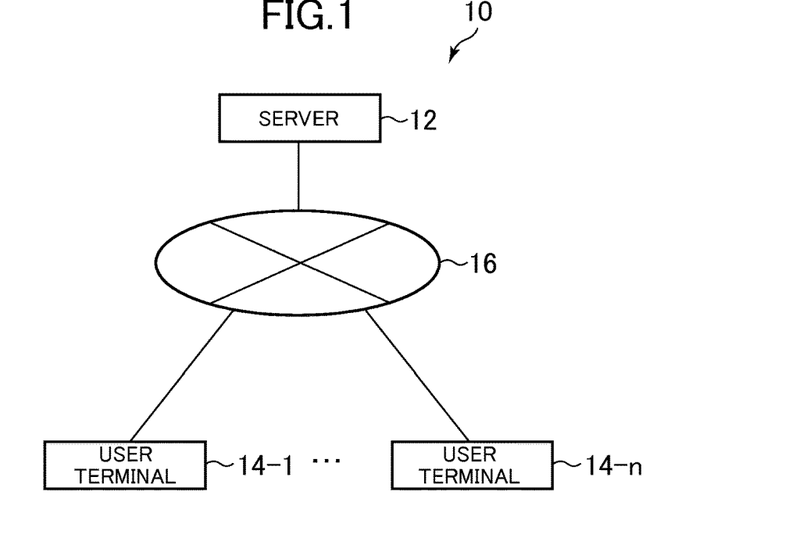
FIG. 1 is an overall configuration diagram of a computer network according to an embodiment of the present invention.

FIG. 1 is an overall configuration diagram of an information processing system 10 according to the embodiment of the present invention. As illustrated in FIG. 1, the information processing system 10 includes a server 12 and user terminals 14 (14-1 to 14-$n$), each of which is mainly constituted of a computer. The server 12 and each of the user terminals 14 are communicable to each other via a computer network 16 such as the Internet.

The server 12 according to this embodiment includes a control unit, which is a program control device such as a central processing unit (CPU) and operates in accordance with programs installed in the server 12, a storage unit such as a memory element, for example, a read-only memory (ROM) and a random access memory (RAM), or a hard disk drive, and a communication unit, which is a communication interface such as a network board. Those elements are connected via a bus. The storage unit of the server 12 stores the programs to be executed by the control unit of the server 12. The storage unit of the server 12 also operates as a work memory of the server 12. The server 12 according to this embodiment is capable of using a web technology to provide to a user a service such as a shopping site on which an item or service can be purchased online.

The user terminal 14 is, for example, an information processing device such as a personal computer, a mobile phone, a personal digital assistant (PDA), and a smart phone. The user terminal 14 includes, for example, a control unit such as a CPU, a storage unit such as a memory element, for example, a ROM and a RAM, and a hard disk drive, an output unit such as a display, an input unit such as a mouse, a keyboard, a touch pad, and a button, a communication unit such as a network board, and a sensor unit such as a microphone, a camera, an illuminance meter, a global positioning system (GPS), and an acceleration sensor. In addition, in the user terminal 14 according to this embodiment, a web browser is preinstalled, and a program of the web browser is executed. The user terminal 14 receives the service provided by the server 12 through the web browser.

In this embodiment, when the user terminal 14 accesses a web page placed in the server 12 through the web browser, the web page is displayed on the display of the user terminal 14. In addition, after the server 12 executes authentication processing of the user, the server 12 may determine an identifier (user ID) of the user who uses the user terminal 14.

In this embodiment, a login page (not shown), which is provided by the server 12 according to this embodiment and in which a user ID input field, a password input field, and a login button are arranged, is displayed on the display of the user terminal 14 via the web browser. Then, the user clicks on the user ID input field or performs other such operation to achieve a state in which a prompt is displayed in the user ID input field, and then uses an input device such as the keyboard to input the user ID to the user ID input field. Then, the user clicks on the password input field or performs other such operation to achieve a state in which a prompt is displayed in the password input field, and then uses the input device such as the keyboard to input a password to the password input field. Then, when the user clicks on the login button, the input user ID and password are transmitted to the server 12. Then, the server 12 executes the authentication processing based on the user ID and the password, which are transmitted from the user terminal 14.

Then, when the authentication is successful, the server 12 generates a portal page of the shopping site and transmits the portal page to the user terminal 14. In this embodiment, the server 12 transmits to the user terminal 14 the portal page capable of controlling whether to display a portal page 20 in a private mode illustrated in FIG. 2 on the display or to display a portal page 22 in a public mode illustrated in FIG. 3 on the display by the web browser of the user terminal 14. Then, the user terminal 14 changes, depending on a change in an environment of the user terminal 14, whether to display the portal page 20 in the private mode on the display via the web browser or to display the portal page 22 in the public mode on the display via the web browser.

Figure 4:
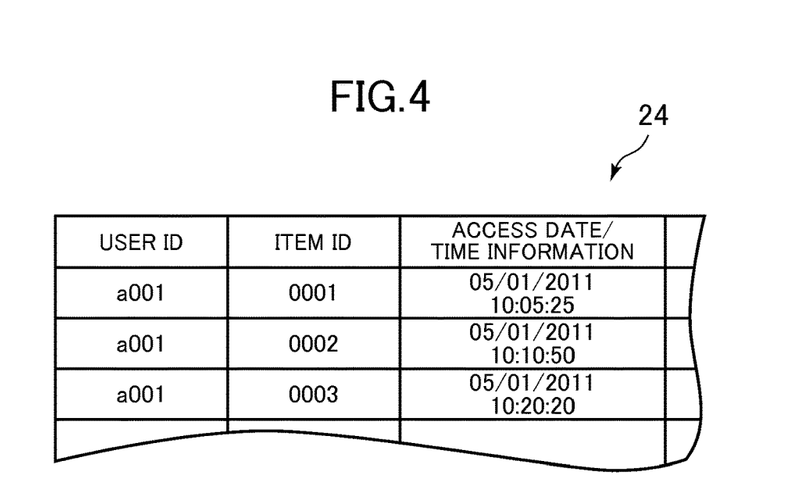
FIG. 4 is a diagram illustrating an example of access history data.
Figure 5:
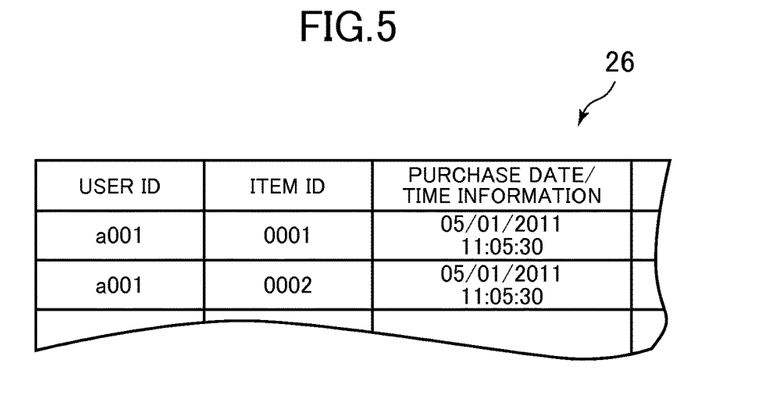
FIG. 5 is a diagram illustrating an example of purchase history data.

Moreover, in this embodiment, when the user accesses a page introducing an item or service sold on the shopping site, the server 12 generates access history data 24 exemplified in FIG. 4, which includes the user ID of the user who accesses the page, an identifier (item ID) of the item or service introduced in the page, access date/time information indicating the date and time the page is accessed, and the like, and stores the access history data 24 in the storage unit included in the server 12. Moreover, when the user purchases an item or service sold on the shopping site, the server 12 generates purchase history data 26 exemplified in FIG. 5, which includes the user ID of the user who purchases the item or service, the item ID of the item or service, information indicating a purchase date and time of the item or service, and the like, and stores the purchase history data 26 in the storage unit included in the server 12.

Figure 6:
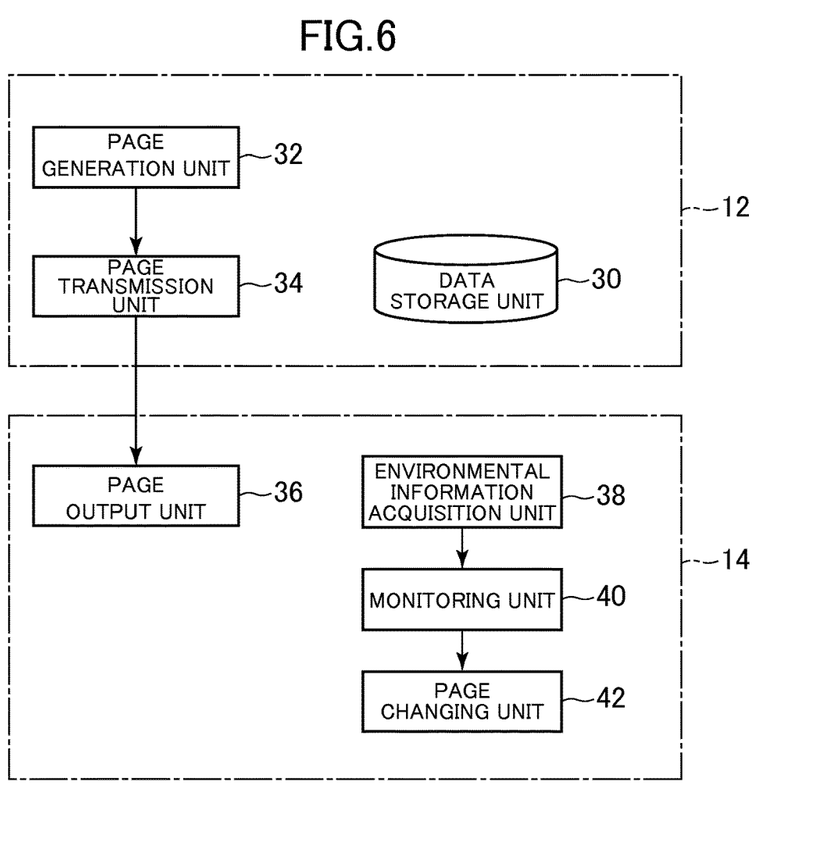
FIG. 6 is a functional block diagram illustrating an example of functions implemented by a server and a user terminal according to the embodiment of the present invention.

FIG. 6 is a functional block diagram illustrating an example of functions implemented by the server 12 and the user terminal 14 according to this embodiment. The server 12 according to this embodiment functionally includes a data storage unit 30, a page generation unit 32, and a page transmission unit 34. The data storage unit 30 is mainly implemented by the storage unit of the server 12. The page transmission unit 34 is mainly implemented by the control unit and the communication unit of the server 12. The other elements are mainly implemented by the control unit of the server 12. The user terminal 14 according to this embodiment functionally includes a page output unit 36, an environmental information acquisition unit 38, a monitoring unit 40, and a page changing unit 42. The page output unit 36 is mainly implemented by the control unit, the communication unit, and the output unit of the user terminal 14. The environmental information acquisition unit 38 is mainly implemented by the sensor unit of the user terminal 14. The other elements are mainly implemented by the control unit of the user terminal 14.

Those elements are implemented by executing the programs installed in the server 12 and the user terminal 14, each of which is a computer, by the control units of the server 12 and the user terminal 14. Note that, the programs are supplied to the server 12 and the user terminal 14 via, for example, a computer readable storage medium such as a compact disc (CD)-ROM and a digital versatile disc (DVD)-ROM, or via a communication network such as the Internet.

Note that, the server 12 and the user terminal 14 according to this embodiment also implement functions (for example, functions regarding online shopping and function of authenticating the user) other than those illustrated in FIG. 6.

Figure 7:
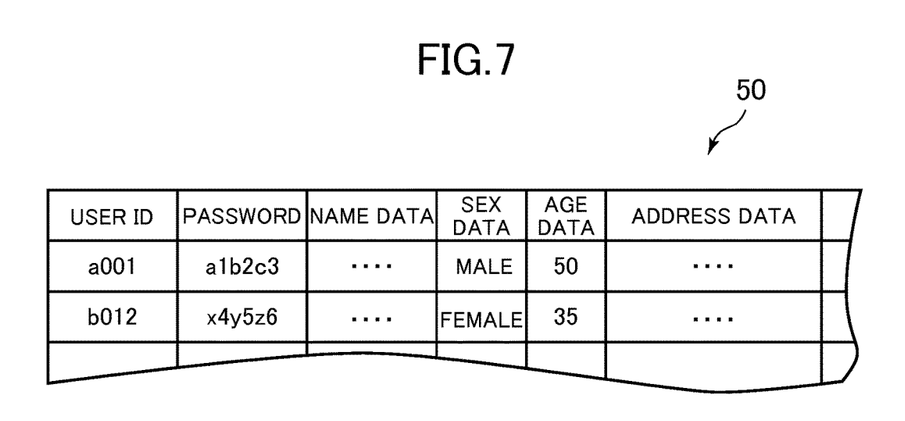
FIG. 7 is a diagram illustrating an example of account data.
Figure 8:
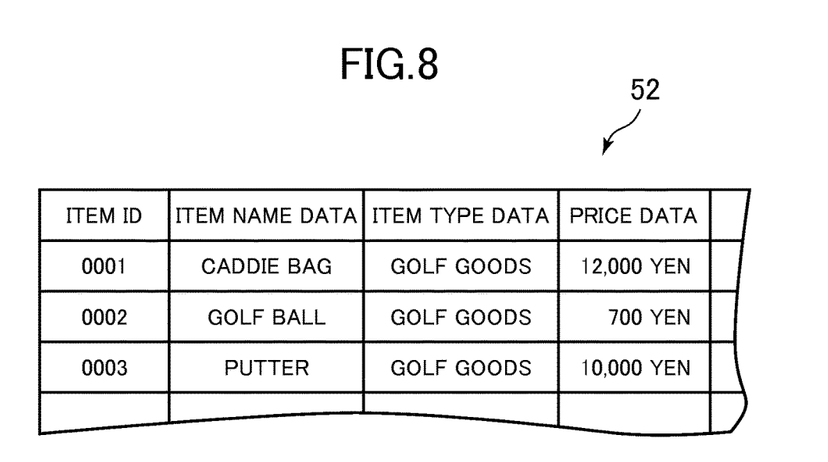
FIG. 8 is a diagram illustrating an example of item master data.
Figure 9:
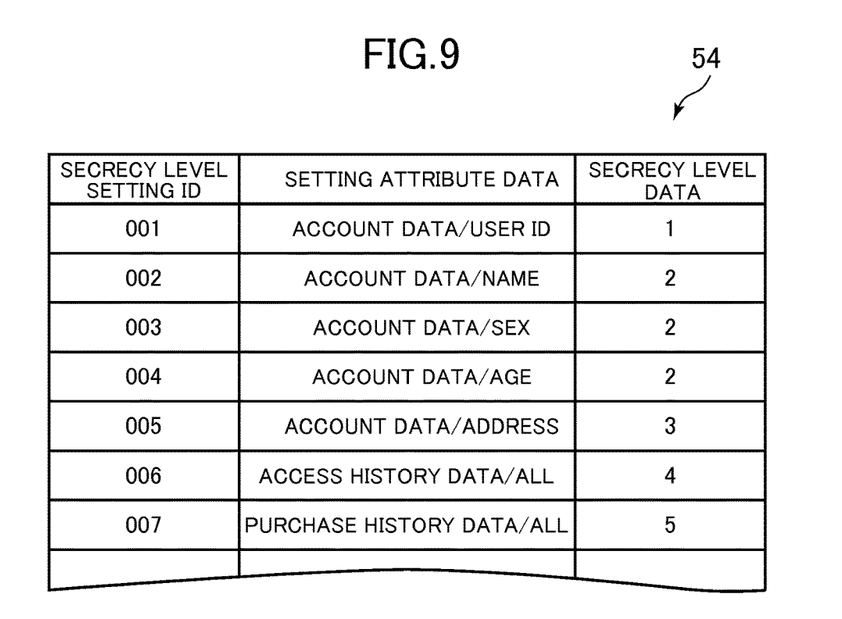
FIG. 9 is a diagram illustrating an example of secrecy level setting data.

In this embodiment, the data storage unit 30 stores in advance the access history data 24 and the purchase history data 26 described above, account data 50 exemplified in FIG. 7, item master data 52 exemplified in FIG. 8, secrecy level setting data 54 exemplified in FIG. 9, and the like.

The account data 50 is data for managing users who use the shopping site, and includes, for example, the identifier of the user (user ID), the password set by the user, and information on the user (information representing attributes of the user) such as name data representing the name of the user, sex data indicating the sex, age data indicating the age, and address data indicating the address.

The item master data 52 is data for managing items or services sold on the shopping site implemented by the server 12, and includes, for example, information indicating the item ID, which is the identifier of the sold item or service, the name of the item or service, the type of the item or service, the price of the item or service, and the like.

The secrecy level setting data 54 is data for managing secrecy levels set to data stored in the data storage unit 30 or attributes included in the data, and includes, for example, information indicating a secrecy level setting ID, which is an identifier of the secrecy level setting data 54, setting attribute data representing the data or attribute to which the secrecy level is set, and secrecy level data representing the secrecy level. In this embodiment, the secrecy level is represented by any integer of from 1 to 5, and as the number becomes larger, secrecy becomes higher.

A value of the secrecy level data may be arbitrarily set by the user. Alternatively, the value of the secrecy level data may be set based on the secrecy level set in advance to each item type, and the type of an item or service introduced in a page newly browsed by the user.

Moreover, a correspondence relationship between a combination of the item type and an attribute of the user and the value of the secrecy level data may be set in advance. Then, the value of the secrecy level data may be set based on the type of the item or service introduced in the page newly browsed by the user and the attribute of the user. For example, it is assumed that item types of items introduced in a page browsed by the user are "cosmetics", "men's shoes", and "drinking water". In this case, when the sex of the user who browses the page is "male", values of the secrecy level data may be set in a descending order of "cosmetics", "drinking water", and "men's shoes", and when the sex of the user who browses the page is "female", the values of the secrecy level data may be set in a descending order of "men's shoes", "drinking water", and "cosmetics".

Moreover, for example, when the user browses a new page, an item or the like that is the same as or related to the item or the like introduced in the page may be determined. Then, the value of the secrecy level data set to the determined item or the like by the user before the new page is browsed may be set as a value of the secrecy level data of the item or the like introduced in the new page browsed by the user.

In this embodiment, a value of "4" is set as the value of the secrecy level data for all the attributes of the access history data 24, and a value of "5" is set as the value of the secrecy level data for all the attributes of the purchase history data 26. Moreover, for the attributes included in the account data 50, as the values of the secrecy level data, a value of "1" is set to the user ID, a value of "2" is set to the name data, the sex data, and the age data, and a value of "3" is set to the address data.

Figure 2:
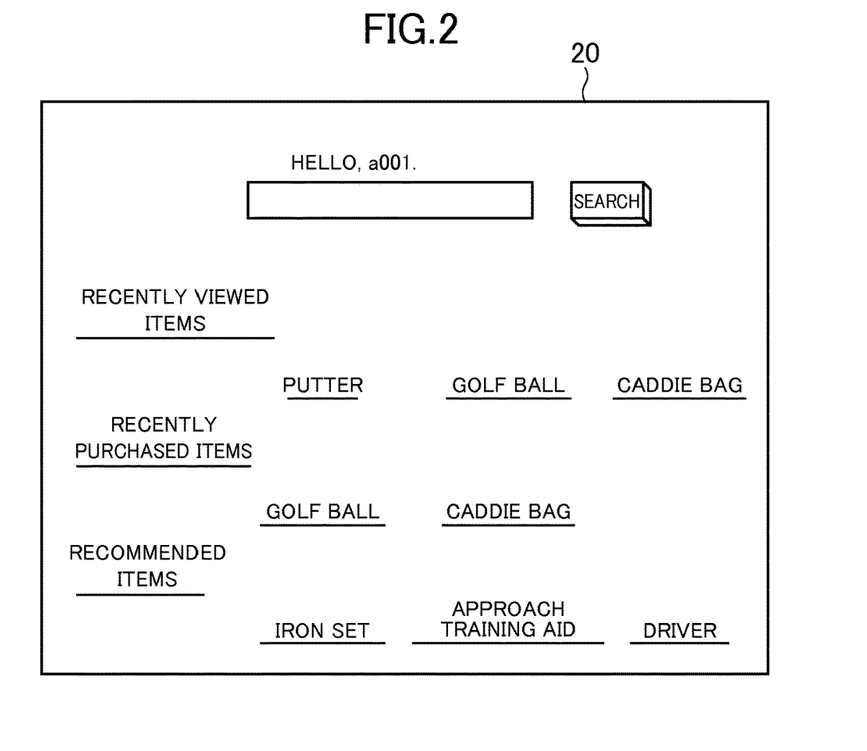
FIG. 2 is a diagram illustrating an example of a portal page in a private mode.
Figure 3:
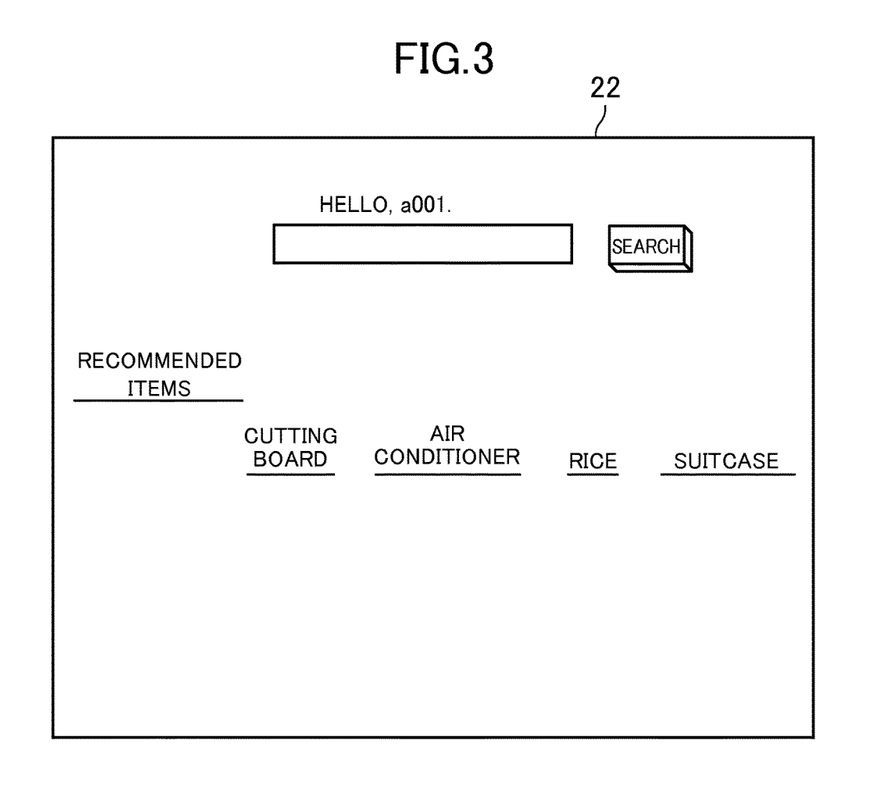
FIG. 3 is a diagram illustrating an example of a portal page in a public mode.

In this embodiment, the page generation unit 32 generates the portal page capable of controlling whether to display the portal page 20 in the private mode illustrated in FIG. 2 on the display or to display the portal page 22 in the public mode illustrated in FIG. 3 on the display by the web browser.

In this embodiment, the information on the basis of which the portal page 20 in the private mode is generated is not limited. In other words, the page generation unit 32 determines information having the value of the secrecy level data that is equal to or less than "5", which is the maximum value of the values of the secrecy level data, and based on the determined information, generates the portal page 20 in the private mode. On the other hand, the information on the basis of which the portal page 22 in the public mode is generated is limited to information to which the secrecy level representing secrecy that is lower than secrecy determined based on the type of the password input by the user is set. For example, the page generation unit 32 determines information having the value of the secrecy level data that is equal to or less than "3", and based on the determined information, generates the portal page 22 in the public mode.

FIGS. 2 and 3 illustrate the portal pages generated when a user (hereinafter referred to as user A) having a user ID of "a001" logs in. In the portal page 20 in the private mode illustrated in FIG. 2, links to pages introducing items or services identified by item IDs associated with the user ID of the user A in the access history data 24 are arranged in a region showing "Recently Viewed Items". Also in the portal page 20 in the private mode, links to pages introducing the items or services identified by the item IDs associated with the user ID of the user A in the purchase history data 26 are arranged in a region showing "Recently Purchased Items". Also in the portal page 20 in the private mode, links to pages introducing items or services recommended to the user A are arranged in a region showing "Recommended Items". The items or services recommended to the user A are determined here based on the item IDs associated with the user ID of the user A in the access history data 24 and the purchase history data 26 in this embodiment. In the region showing "Recommended Items", for example, links to pages introducing items or services which are of the same item type but have not been purchased by the user A are arranged. In this embodiment, as illustrated in FIG. 2, in the portal page 20 in the private mode, links to pages introducing items of the item type: "Golf Goods" are arranged. On the other hand, in the portal page 22 in the public mode, the region showing "Recently Viewed Items" and the region showing "Recently Purchased Items" are not present. Also in the portal page 22 in the public mode, in the region showing "Recommended Items", for example, links to pages introducing items or services determined irrespective of a purchase history and an access history of the user A (for example, best-selling item group or service group within the last one week) are arranged. Note that, for example, in the portal page 22 in the public mode, information arranged in the region showing "Recently Viewed Items" and the region showing "Recently Purchased Items" may be set as hidden data. In other words, the information arranged in the region showing "Recently Viewed Items" and the region showing "Recently Purchased Items" may be transmitted from the server 12 to the user terminal 14 but not displayed on the user terminal 14. Specifically, for example, the information arranged in the region showing "Recently Viewed Items" and the region showing "Recently Purchased Items" in the portal page 22 in the public mode may be enclosed by the tags <div style="visibility:hidden"> and </div>.

In this embodiment, the page transmission unit 34 transmits to the user terminal 14 the portal page generated by the page generation unit 32.

In this embodiment, the page output unit 36 receives the page transmitted by the page transmission unit 34 of the server 12, and outputs the page for display on the display via the web browser.

In this embodiment, the environmental information acquisition unit 38 sequentially acquires environmental information representing an environment of the user terminal 14. The environmental information acquisition unit 38 acquires the environmental information at a predetermined time interval, for example. The environmental information acquired by the environmental information acquisition unit 38 includes, for example, a sound input from the microphone of the user terminal 14, an image taken by the camera of the user terminal 14, information indicating an illuminance around the user terminal 14, which is measured by the illuminance meter of the user terminal 14, information indicating a type of external equipment (such as projector) connected to the user terminal 14, information indicating a position of the user terminal 14, or information indicating a travel amount of the user terminal 14. The position of the user terminal 14 may be determined based on, for example, a measurement result of the GPS, an IP address set to the user terminal 14, or an access point accessed by the user terminal 14. Moreover, the travel amount of the user terminal 14 may be determined based on, for example, a change in the position measured by the GPS, a change in the IP address set to the user terminal 14, a change in the access point accessed by the user terminal 14, or a measurement result of the acceleration sensor.

In this embodiment, the monitoring unit 40 monitors a value of the environmental information acquired by the environmental information acquisition unit 38. Then, when a threshold of the secrecy level determined based on the monitoring result is changed, the monitoring unit 40 notifies the page changing unit 42 that the threshold of the secrecy level is changed.

In this embodiment, the page changing unit 42 determines information for which a value determined based on the information received from the monitoring unit 40 is set as the value of the secrecy level data, as information on the basis of which the portal page after the change is generated. Then, the page changing unit 42 updates the portal page output for display on the display to the portal page generated based on the determined information. In this manner, in this embodiment, the information on the basis of which the portal page after the change is generated is limited to information for which the value determined based on the information received from the monitoring unit 40 is set as the value of the secrecy level data.

As described above, in this embodiment, the monitoring unit 40 determines elements regarding the user, which are a range of the information on the basis of which the portal page is generated, and the page changing unit 42 changes the portal page output for display on the display so that the range of the information on the basis of which the portal page is generated is limited to the elements determined by the monitoring unit 40.

Various specific examples of the change in the portal page described above may be contemplated as follows.

For example, during a period in which the environmental information acquisition unit 38 sequentially acquires the information indicating the position of the user terminal 14, when the position of the user terminal 14 changes from a position in a region preset as a region associated with home to a position in a region preset as a region associated with office, the monitoring unit 40 may notify the page changing unit 42 that the threshold of the secrecy level is changed from "5" to "3". Then, in response to the notification, the page changing unit 42 may change the portal page output for display on the display from the portal page 20 in the private mode to the portal page 22 in the public mode. On the contrary, when the position of the user terminal 14 changes from a position in the region preset as the region associated with office to a position in the region preset as the region associated with home, the monitoring unit 40 may notify the page changing unit 42 that the threshold of the secrecy level is changed from "3" to "5". Then, in response to the notification, the page changing unit 42 may change the portal page output for display on the display from the portal page 22 in the public mode to the portal page 20 in the private mode. Note that, in this example, there may be a region associated with neither home nor office (hereinafter referred to as region during travel). Then, for example, when the position of the user terminal 14 is changed from a position in the region associated with home to a position in the region during travel, the monitoring unit 40 may notify the page changing unit 42 that the threshold of the secrecy level is changed from "5" to "1". Then, in response to the notification, the page changing unit 42 may change the portal page output for display on the display from the portal page 22 in the public mode to a portal page generated based on information having the value of the secrecy level data of "1". Further, when the position of the user terminal 14 is changed from a position in the region during travel to a position in the region associated with office, the monitoring unit 40 may notify the page changing unit 42 that the threshold of the secrecy level is changed from "1" to "3". Then, in response to the notification, the page changing unit 42 may change the portal page output for display on the display from the portal page generated based on the information having the value of the secrecy level data of "1" to the portal page 22 in the public mode.

Moreover, for example, when the position of the user terminal 14 is changed from the 6th floor of a building to another floor, the monitoring unit 40 may notify the page changing unit 42 that the threshold of the secrecy level is changed from "5" to "3", and the page changing unit 42 may change the portal page output for display on the display from the portal page 20 in the private mode to the portal page 22 in the public mode. Moreover, when the position of the user terminal 14 is changed from the floor other than the 6th floor of the building to the 6th floor, the monitoring unit 40 may notify the page changing unit 42 that the threshold of the secrecy level is changed from "3" to "5", and the page changing unit 42 may change the portal page output for display on the display from the portal page 22 in the public mode to the portal page 20 in the private mode.

Moreover, for example, during a period in which the environmental information acquisition unit 38 sequentially acquires the information indicating the travel amount of the user terminal 14, when a travel speed of the user terminal 14 is changed from less than a predetermined speed to the predetermined speed or more, the monitoring unit 40 may notify the page changing unit 42 that the threshold of the secrecy level is changed from "5" to "3", and the page changing unit 42 may change the portal page output for display on the display from the portal page 20 in the private mode to the portal page 22 in the public mode. Similarly, when the travel speed of the user terminal 14 is changed to the predetermined speed, the monitoring unit 40 may notify the page changing unit 42 that the threshold of the secrecy level is changed from "3" to "5", and the page changing unit 42 may change the portal page output for display on the display from the portal page 22 in the public mode to the portal page 20 in the private mode.

Moreover, for example, during a period in which the environmental information acquisition unit 38 sequentially acquires information representing a volume input from the microphone of the user terminal 14, when the volume changes from less than a predetermined volume to the predetermined volume or more, in the same manner as described above, the page changing unit 42 may change the portal page output for display on the display from the portal page 20 in the private mode to the portal page 22 in the public mode. Similarly, when the volume changes from the predetermined volume or more to less than the predetermined volume, in the same manner as described above, the page changing unit 42 may change the portal page output for display on the display from the portal page 22 in the public mode to the portal page 20 in the private mode.

Moreover, for example, the environmental information acquisition unit 38 may sequentially acquire information representing the number of people (hereinafter referred to as estimated number of people present) who are present near the user terminal 14, which is estimated by a known voice recognition technology or the like based on the sound input from the microphone of the user terminal 14. Then, when the estimated number of people present is changed from less than a predetermined number to the predetermined number or more, the page changing unit 42 may change the portal page output for display on the display from the portal page 20 in the private mode to the portal page 22 in the public mode. Similarly, when the estimated number of people present is changed from the predetermined number or more to less than the predetermined number, the page changing unit 42 may change the portal page output for display on the display from the portal page 22 in the public mode to the portal page 20 in the private mode. In this example, the number of people who are present near the user terminal 14 may be estimated based on an image taken by the camera of the user terminal 14.

Moreover, for example, the number of people included in the image taken by the camera of the user terminal 14 may be estimated by using a known face recognition algorithm such as eigenfaces using principal component analysis, linear discriminant analysis, elastic bunch graph matching, hidden Markov model, the neuronal motivated dynamic link matching face recognition technology, and the like. Then, when the estimated number of people is changed from less than the predetermined number to the predetermined number or more, the page changing unit 42 may change the portal page output for display on the display from the portal page 20 in the private mode to the portal page 22 in the public mode. Similarly, when the estimated number of people is changed from the predetermined number or more to less than the predetermined number, the page changing unit 42 may change the portal page output for display on the display from the portal page 22 in the public mode to the portal page 20 in the private mode. Moreover, for example, when a travel speed of a photographed object, which is estimated based on an image taken by the camera of the user terminal 14, is changed from less than a predetermined speed to the predetermined speed or more, the page changing unit 42 may change the portal page output for display on the display from the portal page 20 in the private mode to the portal page 22 in the public mode. Similarly, when the travel speed is changed from the predetermined speed or more to less than the predetermined speed, the page changing unit 42 may change the portal page output for display on the display from the portal page 22 in the public mode to the portal page 20 in the private mode.

Moreover, for example, when a value of the illuminance measured by the illuminance meter of the user terminal 14 is changed from less than a predetermined value to the predetermined value or more, the page changing unit 42 may change the portal page output for display on the display from the portal page 20 in the private mode to the portal page 22 in the public mode. Similarly, when the value of the illuminance is changed from the predetermined value or more to less than the predetermined value, the page changing unit 42 may change the portal page output for display on the display from the portal page 22 in the public mode to the portal page 20 in the private mode.

Moreover, for example, when a projector is connected to the user terminal 14, the page changing unit 42 may change the portal page output for display on the display from the portal page 20 in the private mode to the portal page 22 in the public mode. Similarly, when the projector is disconnected from the user terminal 14, the page changing unit 42 may change the portal page output for display on the display from the portal page 22 in the public mode to the portal page 20 in the private mode.

As described above, according to this embodiment, depending on the change in the environment of the user terminal 14, the portal page output for display on the display of the user terminal 14 is changed dynamically.

Note that, the present invention is not limited to the embodiment described above.

For example, the environmental information acquisition unit 38 may acquire a plurality of different types of environmental information (for example, volume and position). Then, for each type of the environmental information, the monitoring unit 40 may determine thresholds of secrecy levels based on monitoring results of values of the environmental information. Then, when the determined thresholds of the secrecy levels are different, the monitoring unit 40 may notify the page changing unit 42 that the threshold is changed to a smaller one of the secrecy levels.

Figure 10:
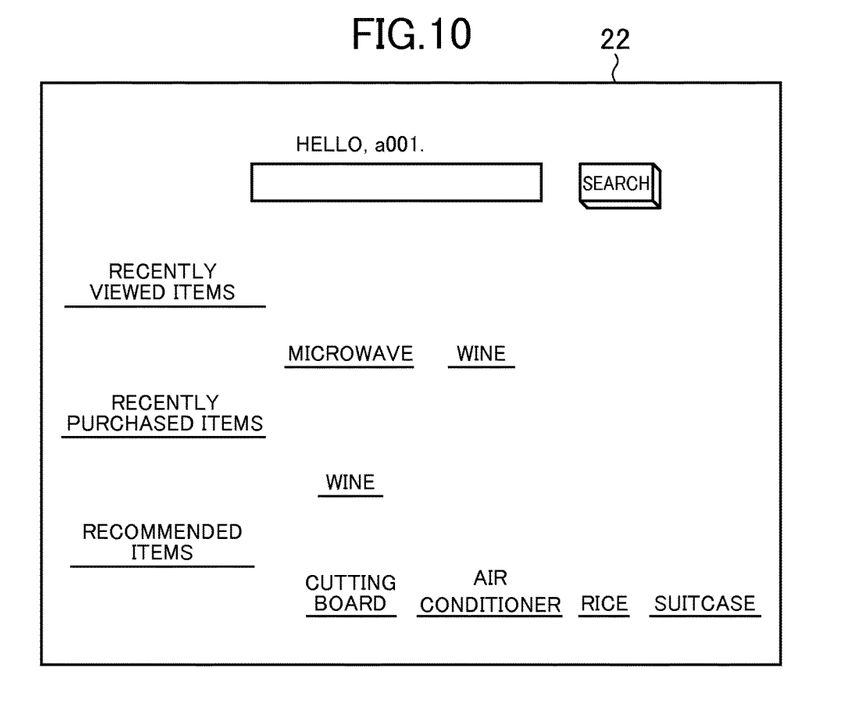
FIG. 10 is a diagram illustrating another example of the portal page in the public mode.

Moreover, for example, as exemplified in FIG. 10, when the page generation unit 32 generates the portal page 22 in the public mode, alternative information may be arranged in the region showing "Recently Viewed Items" and the region showing "Recently Purchased Items". The page generation unit 32 may arrange in the regions, for example, information on predetermined dummy items or services or the like instead of the information limited to be excluded from the portal page.

Moreover, for example, the secrecy level may be set in association with a combination of an attribute of an item (for example, item type or the like) and an attribute of the user (for example, sex or the like). Specifically, for example, to a combination of an item type: "women's bag" and the sex: "male", "5" may be set as the value of the secrecy level. Then, in this case, when the value of the sex data included in the account data 50 of the user who has logged in is "male" and the purchase history data 26 of the user includes an item ID corresponding to a women's bag, a link introducing the item may not be arranged in the portal page 22 in the public mode.

Moreover, for example, there may be three or more combinations of portal pages in which the output for display is controlled and thresholds of secrecy levels associated with the portal pages. For example, which of a portal page generated based on information having the secrecy level of "5" or less, a portal page generated based on information having the secrecy level of "3" or less, and a portal page generated based on information having the secrecy level of "1" is output for display on the display may be controlled by the page changing unit 42.

Moreover, for example, a value of the environmental information as a criterion for increasing the threshold of the secrecy level and a value of the environmental information as a criterion for decreasing the threshold of the secrecy level may be different. More specifically, for example, when the estimated number of people present is changed from 2 to 3, the monitoring unit 40 may provide a notification that the threshold of the secrecy level is changed from "5" to "3", and when the estimated number of people present is changed from 2 to 1, the monitoring unit 40 may provide a notification that the threshold of the secrecy level is changed from "3" to "5". Alternatively, for example, when the estimated number of people present is changed from 2 to 3, the monitoring unit 40 may provide the notification that the threshold of the secrecy level is changed from "5" to "3". On the other hand, when the estimated number of people present is changed from 3 to 2, the monitoring unit 40 may provide a notification on the threshold of the secrecy level that the threshold of the secrecy level is changed from "3" to "4", and further, when the estimated number of people present is changed to 1, the monitoring unit 40 may provide a notification that the threshold of the secrecy level is changed from "4" to "5". In this manner, an amount of change in the secrecy level when the threshold of the secrecy level is changed so as to increase the secrecy may be set larger than an amount of change in the secrecy level when the threshold of the secrecy level is changed so as to decrease the secrecy.

Moreover, for example, a period from a change in the environmental information until the threshold of the secrecy level is changed so as to decrease the secrecy in response to the change may be set longer than a period from the change in the environmental information until the threshold of the secrecy level is changed so as to increase the secrecy in response to the change. Specifically, for example, when the estimated number of people present is changed from 2 to 3, the monitoring unit 40 may provide the notification that the threshold of the secrecy level is changed from "5" to "3". On the other hand, when the estimated number of people present is changed from 3 to 2, the monitoring unit 40 may provide the notification on the threshold of the secrecy level that the threshold of the secrecy level is changed from "3" to "4", and then, when a state in which the estimated number of people present is 2 or less continues after a predetermined period of time has further elapsed (for example, the environmental information acquisition unit 38 acquires the environmental information that the estimated number of people present is 2 or less a predetermined number of times in succession), the monitoring unit 40 may provide the notification that the threshold of the secrecy level is changed from "4" to "5". Alternatively, for example, when the estimated number of people present is changed from 2 to 3, the monitoring unit 40 may provide the notification that the threshold of the secrecy level is changed from "5" to "3" at a timing when the environmental information acquisition unit 38 acquires the environmental information indicating that the estimated number of people present is 3 once. On the other hand, when the estimated number of people present is changed from 3 to 2, the monitoring unit 40 may provide the notification that the threshold of the secrecy level is changed from "3" to "5" after the environmental information acquisition unit 38 has acquired the environmental information indicating that the estimated number of people present is 2 or less a predetermined number of times in succession (for example, three times in succession).

Moreover, for example, in response to a change request received from the user, the information processing system 10 may change the threshold of the secrecy level or change the portal page output for display. In this case, the server 12 may store in the data storage unit 30 the threshold of the secrecy level after the change in association with a value of the most recent environmental information acquired by the environmental information acquisition unit 38. Then, the monitoring unit 40 may have a learning function for updating, based on data thus stored in the data storage unit 30, a relationship between the environmental information and the threshold of the secrecy level as needed.

Moreover, for example, the server 12 may store, in association with the access history data 24 in the data storage unit 30, the value of the most recent environmental information on the date and time the page is accessed. Alternatively, for example, the server 12 may store, in association with the purchase history data 26 in the data storage unit 30, the value of the most recent environmental information on the purchase date and time of the item or service. The monitoring unit 40 may learn, based on the data thus stored in the data storage unit 30, the relationship between the environmental information and the item or service. Then, the monitoring unit 40 may notify the page changing unit 42 of the threshold of the secrecy level, which is determined based on the learning result and the value of the most recent environmental information acquired by the environmental information acquisition unit 38.

Moreover, for example, when a predetermined change occurs in the environmental information (for example, the estimated number of people present exceeds a predetermined value), a portal page 22 in a first public mode corresponding to the change may be displayed on the display, and when a predetermined change that is different from the change occurs in the environmental information (for example, the position of the user terminal 14 has changed), a portal page 22 in a second public mode, which is different from the portal page 22 in the first public mode, may be displayed on the display.

Figure 11:
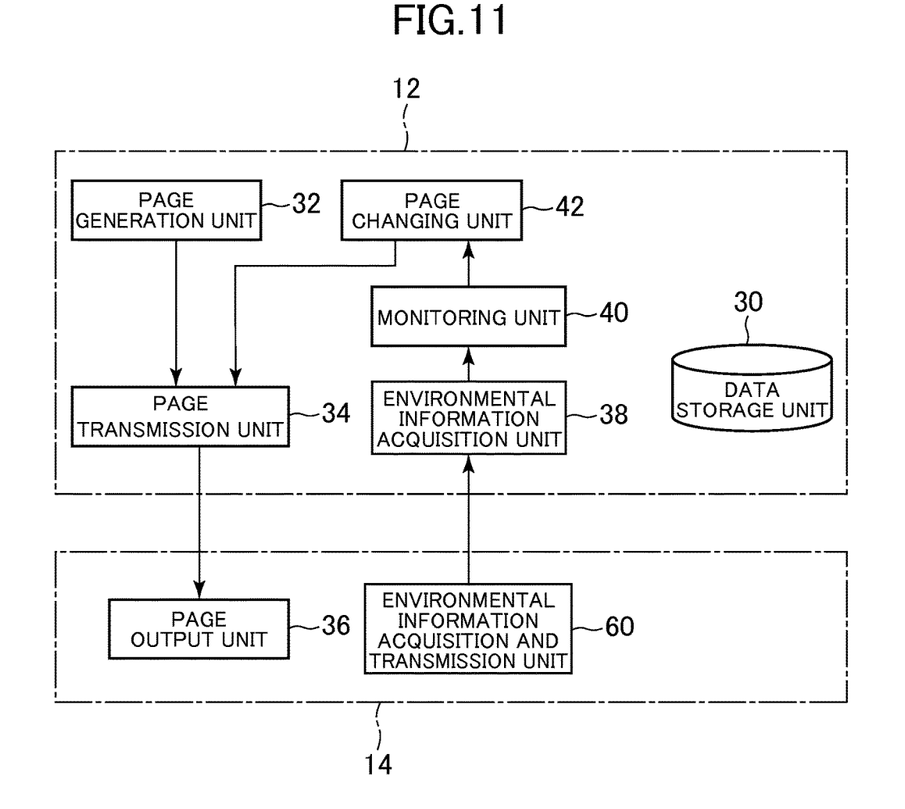
FIG. 11 is a functional block diagram illustrating an example of functions implemented by a server and a user terminal according to another embodiment of the present invention.

Moreover, the division of roles between the server 12 and the user terminal 14 is not limited to the above-mentioned embodiment. FIG. 11 is a functional block diagram illustrating an example of functions implemented by a server 12 and a user terminal 14 according to another embodiment of the present invention. The server 12 according to this embodiment functionally includes a data storage unit 30, a page generation unit 32, a page transmission unit 34, an environmental information acquisition unit 38, a monitoring unit 40, and a page changing unit 42. The data storage unit 30 is mainly implemented by a storage unit of the server 12. The page transmission unit 34 is mainly implemented by a control unit and a communication unit of the server 12. The environmental information acquisition unit 38 is mainly implemented by the control unit and the communication unit of the server 12. The other elements are mainly implemented by the control unit of the server 12. The user terminal 14 according to this embodiment functionally includes a page output unit 36 and an environmental information acquisition and transmission unit 60. The page output unit 36 is mainly implemented by a control unit, a communication unit, and an output unit of the user terminal 14. The environmental information acquisition and transmission unit 60 is mainly implemented by a sensor unit and the communication unit of the user terminal 14.

The data storage unit 30 stores data similar to that of the above-mentioned embodiment. The page generation unit 32 generates a portal page which is similar to the above-mentioned embodiment, and the page transmission unit 34 transmits to the user terminal 14 the portal page generated by the page generation unit 32. The page output unit 36 outputs the portal page received from the server 12 for display on the display.

In this embodiment, the environmental information acquisition and transmission unit 60 sequentially acquires environmental information representing an environment of the user terminal 14 and transmits the environmental information to the server 12. Then, the environmental information acquisition unit 38 of the server 12 sequentially receives the environmental information transmitted from the user terminal 14. Then, the monitoring unit 40 monitors values of the environmental information received by the environmental information acquisition unit 38. Then, when a threshold of a secrecy level determined based on the monitoring result is changed, the monitoring unit 40 notifies the page changing unit 42 of the threshold after the change.

In this embodiment, when the user has successfully logged in, the page transmission unit 34 transmits to the user terminal 14 one of the portal page 20 in the private mode illustrated in FIG. 2 and the portal page 22 in the public mode illustrated in FIG. 3, which is selected depending on the environment of the user terminal 14 at the time. Then, the user terminal 14 outputs the portal page received from the server 12 for display on the display. Then, when the threshold of the secrecy level determined based on the monitoring result is changed and when the threshold after the change is received from the monitoring unit 40, the page changing unit 42 outputs to the page transmission unit 34 an instruction to transmit to the user terminal 14 a portal page based on information having the secrecy level of the threshold after the change or lower. Then, when the instruction to transmit the portal page is received from the page changing unit 42, the page transmission unit 34 transmits to the user terminal 14 the portal page based on the information having the secrecy level of the threshold after the change or lower and an instruction to output the portal page. Then, when the portal page after the change and the instruction to output are received from the server 12, the user terminal 14 updates the portal page output for display on the display to the received portal page.

In this manner, also in this embodiment, depending on the change in the environment of the user terminal 14, the portal page output for display on the display of the user terminal 14 is changed dynamically.

Moreover, the information on the basis of which the portal page is generated is not limited to the above-mentioned information, and may be, for example, a telephone number of the user, a bookmark set by the user, an electronic mail, an address book, schedule data, picture, or a program. Moreover, the information on the basis of which the portal page is generated may be information stored on the server 12 or information stored in the user terminal 14.

Moreover, this embodiment may be applied to a server 12 that provides a service different from the shopping site. Moreover, the above-mentioned specific numerical values and character strings, and specific numerical values and character strings in the drawings are exemplary, and the present invention is not limited to those numerical values and character strings.

The invention claimed is:

1. An information processing terminal, comprising:
   a display;
   a camera taking an image near the information processing terminal;
   a central processing unit; and
   a memory storing programming information causing the central processing unit to be configured to:
   sequentially acquire the image near the information processing terminal taken by the camera;
   analyze the image;
   estimate a number of people who are present near the information processing terminal based on a result of analyzing the image; and
   when it is detected that the estimated number of people who are present near the information processing terminal is changed from less than a predetermined number to the predetermined number or more:
      determine a secrecy level based on the estimated number of people who are present near the information processing terminal which is the predetermined number or more;
      determine first information elements for limitation based on the determined secrecy level among second information elements each of which is associated with a particular secrecy level; and
      change a content of a first web page, which displays a first content and which is displayed on the display and which is based on all of the second information elements, to that of a second web page, which displays a second content and which is based on the second information elements except the first information elements for limitation,
   wherein changing content of a first web page with the first content to a second web page with the second content includes:
      adding the second content to the second web page that was not displayed on the first web page, and
      ceasing to display the first content from the first web page on the second web page;
   wherein the first content is tailored to a first user's purchase history or access history, and
   wherein the added second content to the second web page is content that is irrespective of the first user's purchase history or access history.

2. The information processing terminal according to claim 1,
   wherein the processor is further configured to:
   receive the second information from a web server in advance.

3. The information processing terminal according to claim 1, the first web page is a first shopping web page which displays recommended items which is based on access history data and purchase history data, and
   the second web page is a second shopping web page which displays recommended items which is not based on the access history data and the purchase history data.

4. The information processing terminal according to claim 3, wherein the second content of the second web page is a best-selling item group or best-selling service group.

5. The information processing terminal according to claim 1, wherein the first content of the first web page includes recommended items, and the second content of the second web page includes recommended items.

6. An information processing method, executed using a central processing unit and a memory, comprising:
   sequentially acquiring an image near an information processing terminal taken by a camera included in the information processing terminal;
   analyzing the image;
   estimating a number of people who are present near the information processing terminal based on a result of analyzing the image; and
   when it is detected that the estimated number of people who are present near the information processing terminal is changed from less than a predetermined number to the predetermined number or more:
      determining a secrecy level based on the estimated number of people who are present near the information processing terminal which is the predetermined number or more;
      determining first information elements for limitation based on the determined secrecy level among second information elements each of which is associated with a particular secrecy level; and
      changing a content of a first web page, which displays a first content and which is displayed on the display and which is based on all of the second information elements, to that of a second web page, which displays a second content and which is based on the second information elements except the first information elements for limitation,
   wherein changing content of a first web page with the first content to a second web page with the second content includes:
      adding the second content to the second web page that was not displayed on the first web page, and
      ceasing to display the first content from the first web page on the second web page;
   wherein the first content is tailored to a first user's purchase history or access history, and
   wherein the added second content to the second web page is content that is irrespective of the first user's purchase history or access history.

7. An information processing system, comprising:
   an information processing terminal comprising:
      a display; and
      a camera taking an image near the information processing terminal, and a server comprising:
      a central processing unit; and
      a memory storing programming information causing the central processing unit to be configured to:
      sequentially acquire the image near the information processing terminal taken by the camera;
      analyze the image;
      estimate a number of people who are present near the information processing terminal based on a result of analyzing the image; and
      when it is detected that the estimated number of people who are present near the information processing terminal is changed from less than a predetermined number to the predetermined number or more:
         determine a secrecy level based on the estimated number of people who are present near the information processing terminal which is the predetermined number or more;

determine first information elements for limitation based on the determined secrecy level among second information elements each of which is associated with a particular secrecy level; and change a content of a first web page, which displays a first content and which is displayed on the display and which is based on all of the second information elements, to that of a second web page, which displays a second content and which is based on the second information elements except the first information elements for limitation, wherein changing content of a first web page with the first content to a second web page with the second content includes:

adding the second content to the second web page that was not displayed on the first web page, and ceasing to display the first content from the first web page on the second web page;

wherein the first content is tailored to a first user's purchase history or access history, and wherein the added second content to the second web page is content that is irrespective of the first user's purchase history or access history.

* * * * *